(12) United States Patent
Burne et al.

(10) Patent No.: US 7,491,935 B2
(45) Date of Patent: Feb. 17, 2009

(54) THERMALLY-DIRECTED OPTICAL PROCESSING

(75) Inventors: Richard A. Burne, Ellicott City, MD (US); Dan T. Horak, Ellicott City, MD (US); Timothy J. Case, Marriottsville, MD (US)

(73) Assignee: Honeywell International Inc., Morristown, NJ (US)

(*) Notice: Subject to any disclaimer, the term of this patent is extended or adjusted under 35 U.S.C. 154(b) by 229 days.

(21) Appl. No.: 11/481,262

(22) Filed: Jul. 5, 2006

(65) Prior Publication Data

US 2008/0006772 A1    Jan. 10, 2008

(51) Int. Cl.
*G01J 5/00* (2006.01)
(52) U.S. Cl. .................................. 250/330
(58) Field of Classification Search ............... 250/332, 250/330; 348/422.1
See application file for complete search history.

(56) References Cited

U.S. PATENT DOCUMENTS

| 3,806,633 | A | 4/1974 | Coleman |
|---|---|---|---|
| 3,953,667 | A | 4/1976 | Layton |
| H1599 | H | 10/1996 | Task |
| 6,130,705 | A | 10/2000 | Lareau |
| 6,174,061 | B1 | 1/2001 | Cooper |
| 6,584,382 | B2 | 6/2003 | Karem |
| 6,646,799 | B1 | 11/2003 | Korniski |
| 2002/0140822 | A1 | 10/2002 | Kahn |
| 2006/0043296 | A1* | 3/2006 | Mian et al. ............ 250/330 |

FOREIGN PATENT DOCUMENTS

| GB | 1382158 A | | 1/1975 |
|---|---|---|---|
| GB | 2096427 A | * | 10/1982 |
| WO | WO2005072431 A2 | | 8/2005 |

* cited by examiner

*Primary Examiner*—Constantine Hannaher
(74) *Attorney, Agent, or Firm*—Fogg & Powers LLC (57) ABSTRACT

A thermally-directed optical imager and a method of thermally-directing optical processing are described. The thermally-directed imager includes a thermal image sensor, an optical image sensor, and a processor. The thermal and optical sensors respectively generate thermal image and optical image signals. The processor uses the thermal image signal to determine an optical processing region, which the processor uses to derive a compressed-image signal. The optical processing region may be determined by detecting a center of heat-mass associated with the thermal image signal or by performing an edge detection algorithm. In addition, the thermally-directed imager may be focused, zoomed, or centered via the thermal image signal.

20 Claims, 9 Drawing Sheets

THERMALLY-DIRECTED OPTICAL PROCESSING

FIELD

The invention relates to the field of optical image signal processing, and more particularly to a method of increasing optical image processing efficiency.

BACKGROUND

Optical imaging technology is widely used in military, surveillance, and other remote monitoring applications. Typically, an optical imager, which in a basic form comprises a lens coupled with an optical image sensor, receives optical radiation that is reflected off an object, uses the sensor to convert the optical radiation into an image signal, and transmits the image signal to another device. A monitor, for example, or other similar type of device, may receive the image signal and use the image signal to re-construct an optical representation of the object.

The maturation of today's semiconductor technology has allowed relatively inexpensive, charge-coupled device (CCD) based or CMOS based optical imaging to advance in resolution and spectral range. Moreover, as the affordability of optical imaging technology increases, the implementations have become more varied and extensive. For example, in military applications optical imagers may be included in weaponry for accurately detecting targets. A soldier may include an imager within a rifle scope, increasing the soldier's ability to detect enemy targets. An unmanned aerial vehicle, on the other hand, may use optical imaging to locate enemy targets and broadcast potential target locations to an off-site location.

SUMMARY

Unfortunately, despite the affordability and increased availability of optical imaging technology, the amount of data that is captured by an optical imager may be quite large, necessitating time-consuming image processing and a large bandwidth to communicate optical imaging data. In many applications, accommodating larger bandwidths creates burdensome overhead for image data transmission.

Therefore, a thermally-directed imager is presented. A thermal imager senses infrared (IR) radiation. The thermally-directed imager may be advantageously employed by confining the processing of an optical image signal to an optical processing region that is derived, at least in part, by a thermal image signal. In one example, a thermally-directed imager includes a thermal image sensor, an optical image sensor, and a processor. The thermally-directed imager may also include lenses for focusing infrared and optical radiation onto image sensors.

To convert infrared radiation into an electronic signal, the thermal sensor receives the infrared radiation and accordingly generates a thermal image signal. To convert optical radiation into an electronic signal, the optical sensor, on the other hand, receives optical radiation and converts the optical radiation into an optical image signal. In an example, the thermal sensor may comprise an IR sensing array for receiving and converting thermal radiation and an optical sensor may comprise a charge coupled device (CCD) for receiving and converting optical radiation.

In general, the processor uses the thermal image signal to process the optical image signal and create a compressed-image signal. As an example, the processor creates an optical processing region and limits the processing of the optical image to the optical processing region. The processor, for example, may use the thermal image signal to detect a center of heat-mass. In another example, the processor may use the thermal image signal to perform an edge detection algorithm.

In addition to using a center of heat-mass and/or an edge detection algorithm, the processor may use an input temperature-range signal to further derive the optical processing region. In other examples, the processor may also be configured to perform a variety of functions such as using the thermal image signal to direct the focus, zoom, and/or centering of a lens. Also, the processor may output the compressed-image signal for wired or wireless transmission.

In an alternative example, a method of thermally-directing optical processing is also presented. The method includes receiving a thermal image signal, determining an optical processing region based on the thermal image signal, and generating a compressed-image signal using the optical processing region. The method may be performed by a processor that is coupled with both a thermal image sensor and an optical image sensor. For example, the thermal sensor may receive infrared radiation and accordingly generate a thermal image signal. In addition, the optical sensor may receive optical radiation and create an optical image signal. A processor may use the optical processing region to process the optical image signal. In addition, the processor may provide a variety of other signal processing and data transmission functions.

Generally speaking, in the method, the optical processing region may be determined in a variety of ways. In one example, a center of heat-mass associated with the thermal image signal may assist in determining the optical processing region and a processing window may be centered about the center of mass. Alternatively or additionally, the processor may use an edge detection algorithm to determine the optical processing region.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Certain examples are described below in conjunction with the appended drawing figures, wherein like reference numerals refer to like elements in the various figures, and wherein.

DETAILED DESCRIPTION a) A Thermally-Directed Optical Imager

A thermally-directed optical imager may be used to capture optical and infrared radiation, and generate a compressed-image signal. As used herein, the term optical radiation refers to electromagnetic radiation that is visible to the human eye. The term infrared radiation refers to electromagnetic radiation that has a wavelength longer than that of visible light, i.e., longer than 0.75 microns but shorter than 1 mm.

Generally speaking, a thermally-directed imager may be used in a variety of applications such as monitoring and surveillance. For example, the thermally-directed imager may be used to monitor a remote location by capturing an image of the location and generating a compressed-image signal based on the captured image. The thermally-directed imager, for example, may also be configured to output the compressed-image signal and transmit the compressed-image signal to an off-site location. The compressed-image signal may be received at the off-site location and used to re-create the captured image. Moreover, the compressed-image signal may be updated and periodically transmitted, creating real-time feedback.

Advantageously, the thermally-directed imager uses the received infrared radiation to determine an optical processing region and thus direct the processing of an optical image signal. The optical processing region, for example, may be based on a region of elevated temperature within the received infrared radiation. It is much less computationally intensive to detect this region based on temperature than to detect it based the optical image, using shape-based and color-based image processing methods. By restricting the processing of the optical signal to the optical processing region, the amount of overhead, or bandwidth associated with transmitting an image signal representative of the entirety of the received optical radiation may be reduced.

Figure 1A:
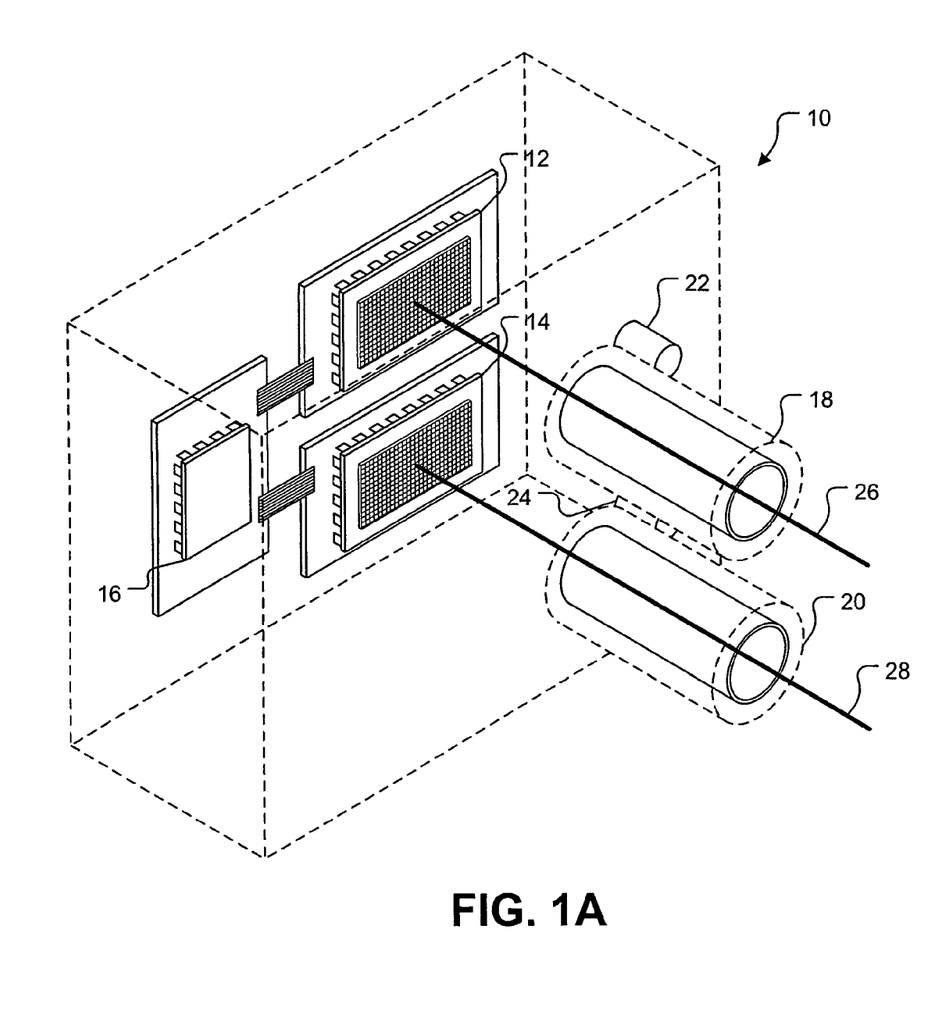
FIG. 1A is an isometric drawing of a thermally-directed optical imager comprising two separate lenses, according to an example.

Turning now to the figures, FIG. 1A is an isometric diagram of a thermally-directed optical imager 10. The thermally-directed imager 10 comprises a thermal image sensor 12, an optical image sensor 14, a processor 16, lenses 18, 20, and lens adjusters 22, 24. The thermal sensor 12 is coupled to receive infrared radiation 26 via the lens 18. The optical sensor 14, on the other hand, is coupled to receive optical radiation 28 via the lens 20. The thermal sensor 12 may comprise an infrared transducer array (such as a CMOS based bolometer array) and the optical sensor 14 may comprise a charge coupled device (CCD) or a CMOS device. These sensors are configured to capture thermal and optical radiation, respectively, and generate signals representative of the energies contained within the captured radiations.

Typically, a CCD includes arrays of capacitors, where each capacitor within an array stores a charge correlative with an energy level of reflective optical radiation. The CCD uses a spatial distribution of the capacitors to construct an image and generate an image signal that is representative of the captured image. The image signal may be used by devices, such as a monitor, or circuitry, such as a processor, to create an image representative of the radiation captured by the CCD. To create a thermal image signal, a thermal transducer array should be configured to capture energies associated with infrared wavelengths.

The thermal sensor 12 may use an infrared transducer to generate a thermal image signal, which the thermal sensor 12 communicates to the processor 16. The processor 16, for example, may work in conjunction with a memory storing processing instructions (not shown). Furthermore, although shown as a separate entity, the processor 16 may be embedded in either of the sensors 12, 14. When the processor 16 receives the thermal image signal, the processor 16 may use the thermal image signal to derive an optical processing region. Either simultaneous to the thermal-signal generation or at a different time, the optical sensor 14 may use a CCD to generate an optical image signal. The processor 16 may receive the optical image signal, and use the optical processing region to process the optical image signal and produce a compressed-image signal. The compressed-image signal is compressed relative to the optical image signal, so that more useful or relevant information may be conveyed within an output signal while conserving bandwidth. However, in general, the compressed-image is one type of signal that may derived by the processor 16. It should be understood that other types of output signals are possible, and the term "compressed" should not be viewed as limiting.

Once the optical image signal is compressed, the processor 16 may output the compressed-image signal to other internal or external circuitry. In one example, the processor 16 may use the compressed-image signal to control each of the lens adjusters 22, 24, and accordingly adjust the focus of the lenses 18, 20. Alternatively, the processor 16 may be coupled with a transmitter (not shown) either embedded in or external to the processor 16. The transmitter, for example, may transmit the compressed-image signal to a remote monitoring location.

Figure 1B:
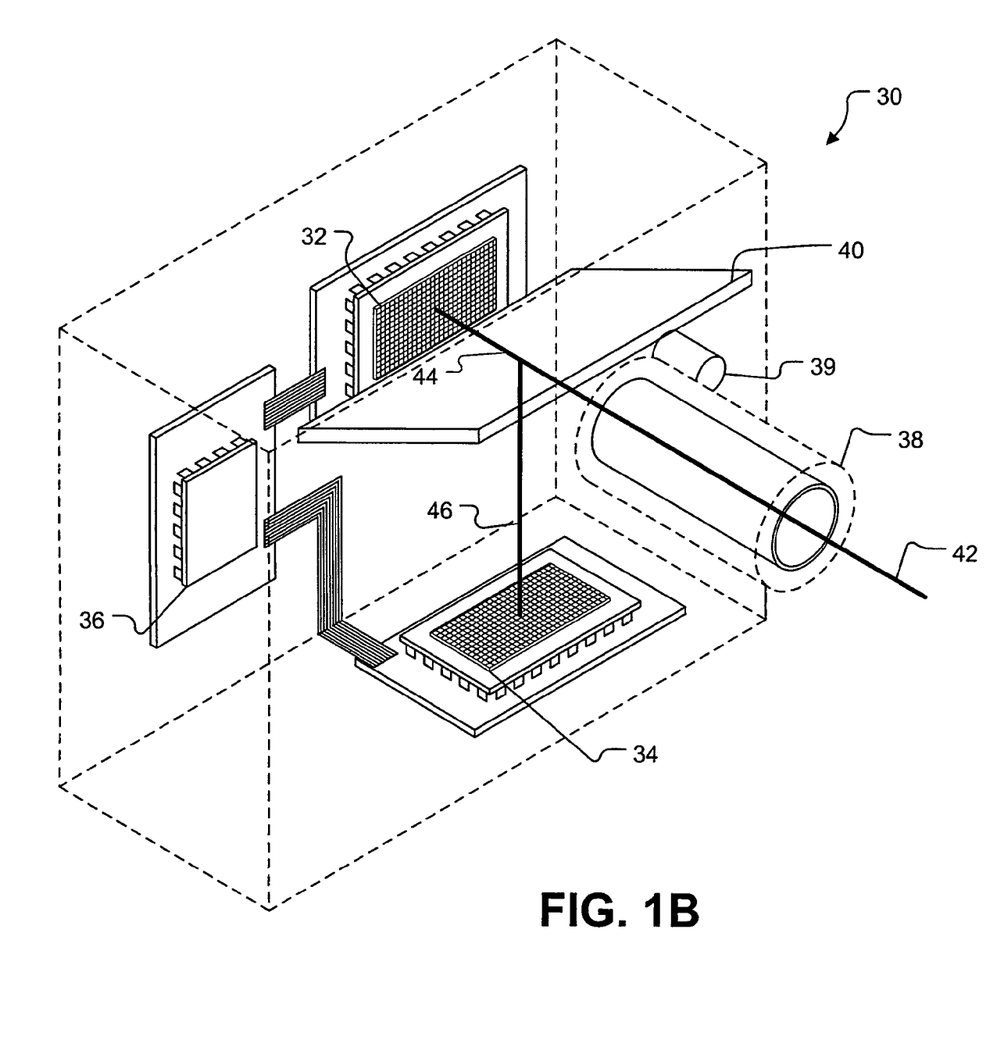
FIG. 1B is an isometric drawing of a thermally-directed optical imager comprising a single-lens, according to an example.

FIG. 1B shows an isometric drawing of an alternative configuration of a thermally-directed imager. In FIG. 1B a thermally directed imager 30 is shown comprising a thermal image sensor 32, an optical image sensor 34, a processor 36, a lens 38, a lens adjuster 39, and a cold mirror 40. The thermal and optical sensors 32, 34 are electrically coupled to the processor 36 and optically coupled to the lens 38 via the cold mirror 40. In the configuration of FIG. 1B, one lens (in lieu of two separate lenses) is coupled to receive optical and infrared radiation 42. The cold mirror allows the infrared wavelengths to pass through the mirror while wavelengths in the optical region of light are reflected at a 90-degree angle. (Although shown in FIG. 1B at an exaggerated angle, the cold mirror 40 may be preferably positioned at a 45-degree angle with respect to the lens 38). The thermal sensor 32 uses the beam 44 to generate a thermal image signal and the optical sensor 34 uses the beam 46 to accordingly generate an optical image signal. Similar to the imager 10 of FIG. 1A, the processor 36 is configured to process the optical image signal based on the thermal image signal.

Independent of how the optical and infrared radiation is achieved, a spatial position within the optical image signal should be correlative with substantially the same spatial position within the thermal image signal. By arranging lenses in a boresighted manner such as by placing the lenses 18, 20 in close proximity with respect to each other, or by using the lens 38 to capture both optical and infrared radiation, the optical image and thermal image signals may be spatially correlative. It should be understood, however, that in either of the thermally-directed imagers 10, 30, the processors 16, 36 may contain instructions or logic for further spatial correlation of the optical image and thermal image signals.

b) Optical and Thermal Images

Figure 2:
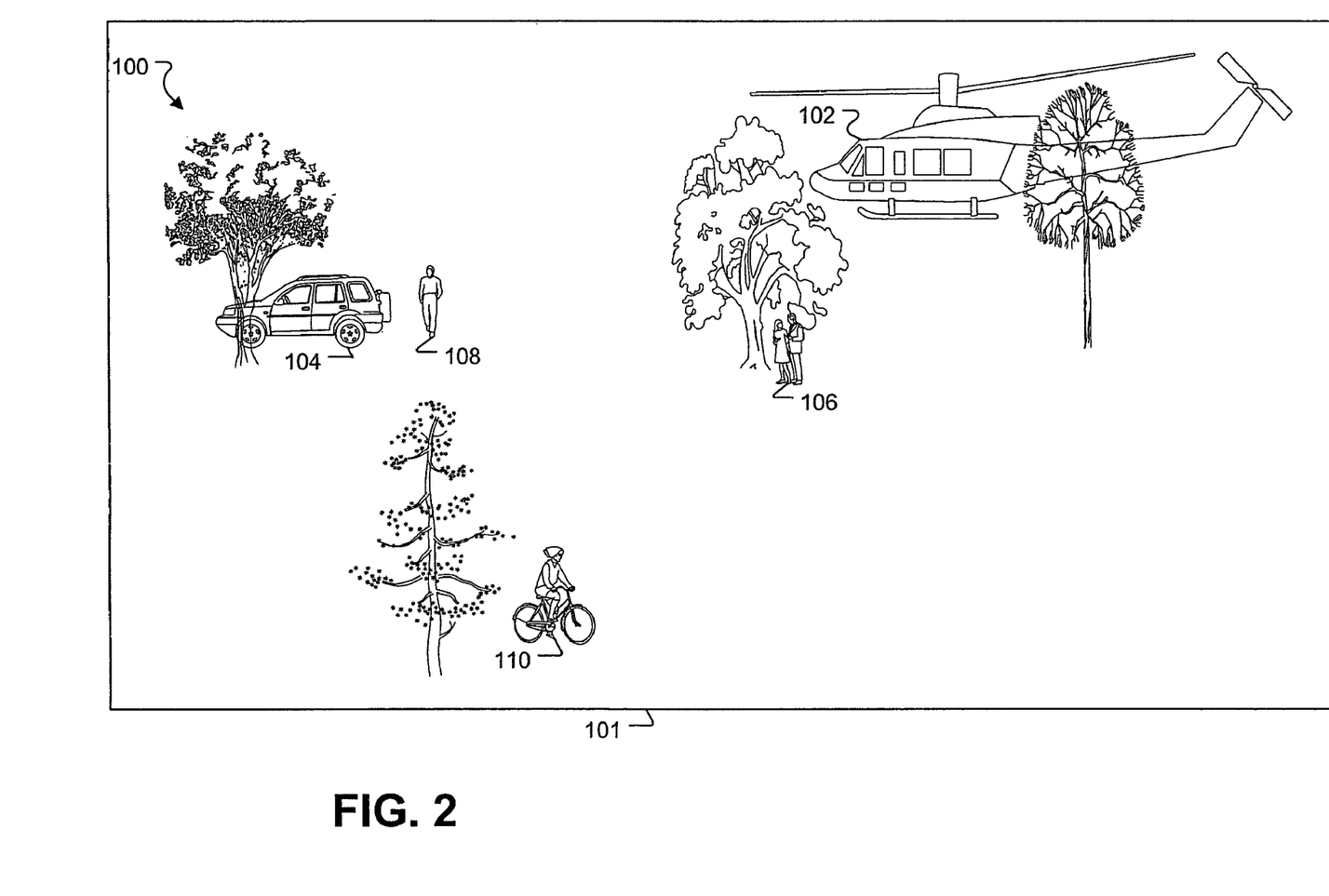
FIG. 2 is an optical image of a setting, which is associated with an optical image signal, according to an example.
Figure 3:
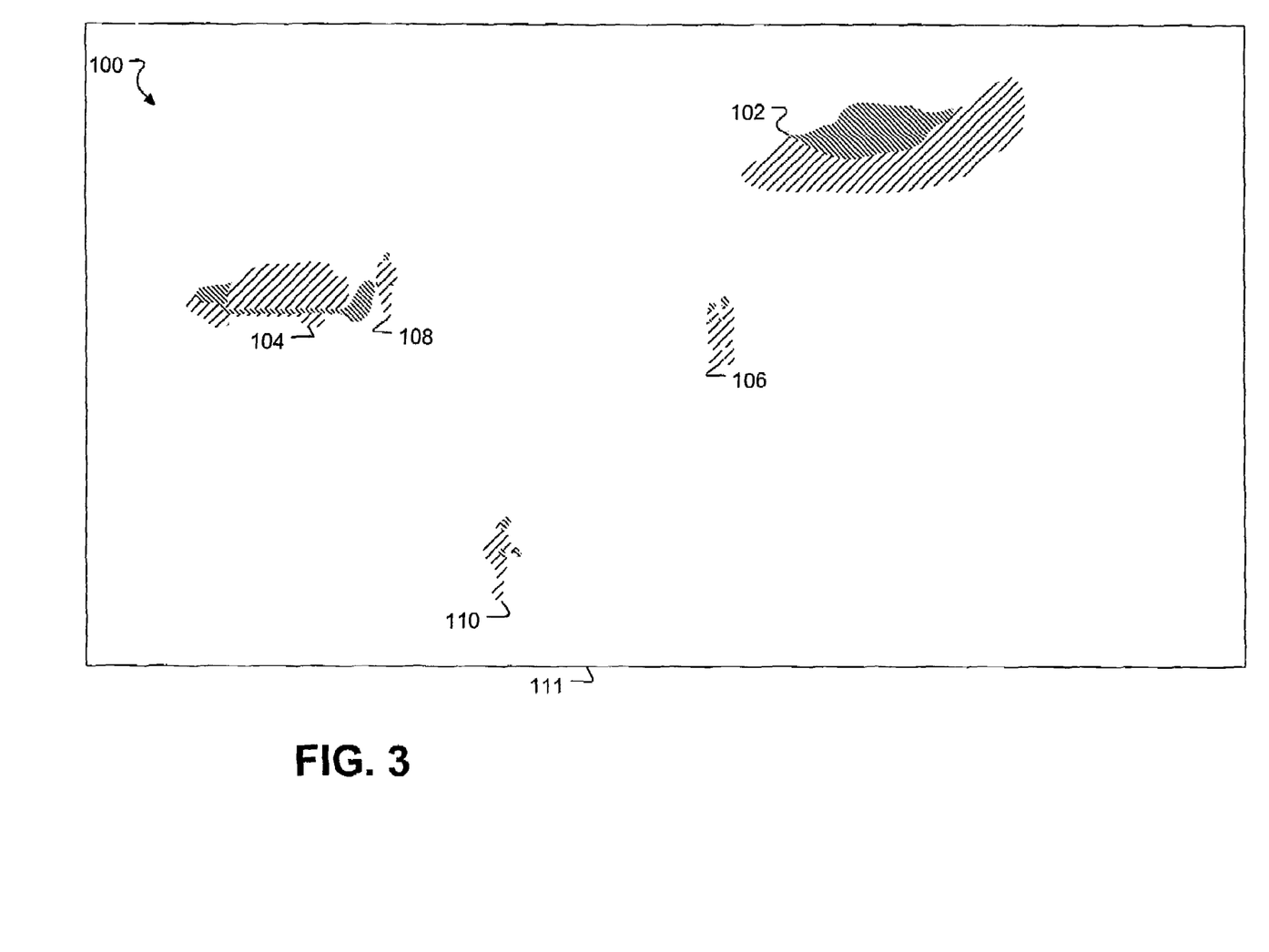
FIG. 3 is a thermal image of the setting of FIG. 2, which is associated with a thermal image signal, according to an example.

FIGS. 2 and 3 respectively show an optical image and a thermal image of a setting 100. A thermally-directed imager, such as one of the imagers 10, 30, may internally generate an optical image signal that is representative of the optical image and a thermal image signal that is representative of the thermal image. As will be described below, the thermally-directed imager may use the thermal image signal to direct the processing of the optical image signal and accordingly output a compressed-image signal. For ease of understanding, the description below generally describes processing an optical image signal associated with one or more non-stationary objects. However, it should be understood that the optical image signal associated with one or more stationary objects may also be processed in the manner described below.

FIG. 2 shows an optical image 101 of the setting 100 comprising stationary objects and non-stationary objects. Non-stationary objects include a helicopter 102, an SUV 104, a couple 106, a strolling man 108, and a bicycling woman 110. The setting 100 further includes stationary objects, such as various trees. Although not shown, the setting 100 could comprise additional stationary and non-stationary objects. FIG. 2, however, is intended to serve as a general example and should not be viewed as limiting. For example, depending on the type of application that a thermally-directed optical imager is used for, the types of stationary and non-stationary objects within a particular setting may be quite varied. It should be understood, therefore, that other examples are possible.

As shown, the optical image 101 may be captured by an optical image sensor. The optical image sensor, as described above, uses optical radiation to generate an optical image signal, which may be used by a device or circuitry (e.g., a monitor, a processor, a computer, etc.) to re-construct the optical image 101. In a similar fashion, as shown in FIG. 3, a thermally-directed imager may use a thermal imager sensor to generate a thermal image signal that may be used by a device or circuitry to re-construct a thermal image.

In FIG. 2, an object's brightness is correlative with the amount of optical energy the optical sensor captures. Similarly, in FIG. 3, an object's temperature is correlative with the amount of infrared radiation that the thermal sensor captures. For example, in FIG. 3, a thermal image 111 of the setting 100 shows the non-stationary objects but does not show the stationary objects. The stationary objects (i.e. the trees) do not appear within the thermal image 111 because the stationary objects have a relatively low amount of temperature when compared to the non-stationary objects.

For this reason, in some examples, a thermal imager may include a temperature-threshold adjustment for adjusting the sensitivity of the thermally-directed imager so that relatively low-temperature objects may be captured or alternatively filtered-out. Or, more generally, the thermally-directed imager may include a temperature-range input for selecting a temperature range and using the temperature range to filter objects out of a thermal image signal. For example, the temperature range-input may be used so that only objects having a temperature of about 37° C. are captured. In this manner, the human objects in FIG. 3, such as the human objects 106, 107, 110 may be captured in the thermal image signal and the higher temperature objects (i.e., the helicopter 102 and the SUV 104) may be substantially filtered out.

c) Thermally Directed Optical Processing

In certain applications, stationary objects, and those with a relatively low temperature, may not convey information that is relevant or useful to a user. For example, although the setting 100 includes stationary objects, these stationary objects are fixed at the same location. For example, although the trees shown in the setting 100 may sway over time, the trees generally remain fixed. Processing an image signal that contains the trees may be redundant, especially if an imager is used to capture real-time images for monitoring the setting 100. Thus, when processing an optical image signal associated with setting 100, a thermally-directed imager thermally directs the processing of the optical image signal to one or more optical processing regions, where an optical processing region is associated with a preferable temperature, or temperature range.

Figure 4:
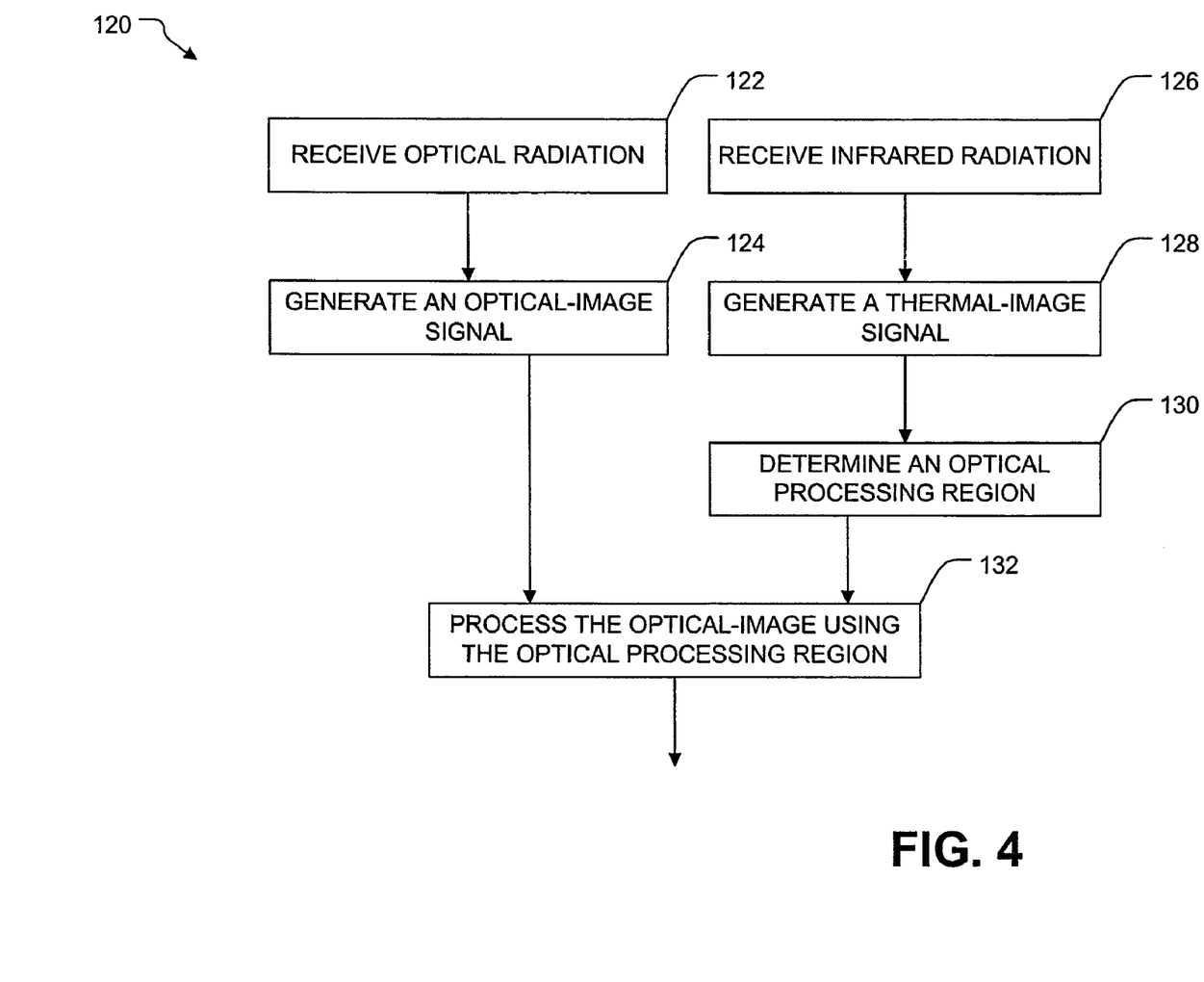
FIG. 4 is a flow diagram of a method of thermally-directing optical processing, according to an example.

FIG. 4, accordingly, shows a flow diagram of a method 120, which may be used to thermally direct the processing of an optical image signal. The flow diagram generally illustrates processing an optical image signal based on a thermal image signal. The optical image signal, for example, may be associated with the optical image 101 of FIG. 2 and the thermal image signal may be associated with the thermal image 111 of FIG. 3.

At block 122, an optical image sensor may receive optical radiation and accordingly generate the optical image signal at block 124. Similarly, at block 126, a thermal image sensor may receive thermal radiation and generate the thermal image signal at block 128.

At block 130, an optical processing region is determined from the thermal image signal. The optical processing region may be derived in various ways based on various detection instructions, programs, or algorithms. As will be described below, some examples of determining the processing region may comprise detecting a center of heat-mass, determining a processing window, and/or performing an edge detection algorithm, all of which may be carried out using the thermal image signal. A variety of other processing schemes are also possible.

Furthermore, although not shown, the method 120 may also include a block for receiving a temperature-range input signal. Such a temperature-range input signal, as described above, may be used to restrict one or more optical processing regions to a particular temperature or temperature range. For example, in FIG. 3 the thermal image 111 shows non-stationary objects having an associated amount of infrared radiation. A temperature-range input signal may be used to adjust which objects are captured in a thermal image signal.

Figure 5:
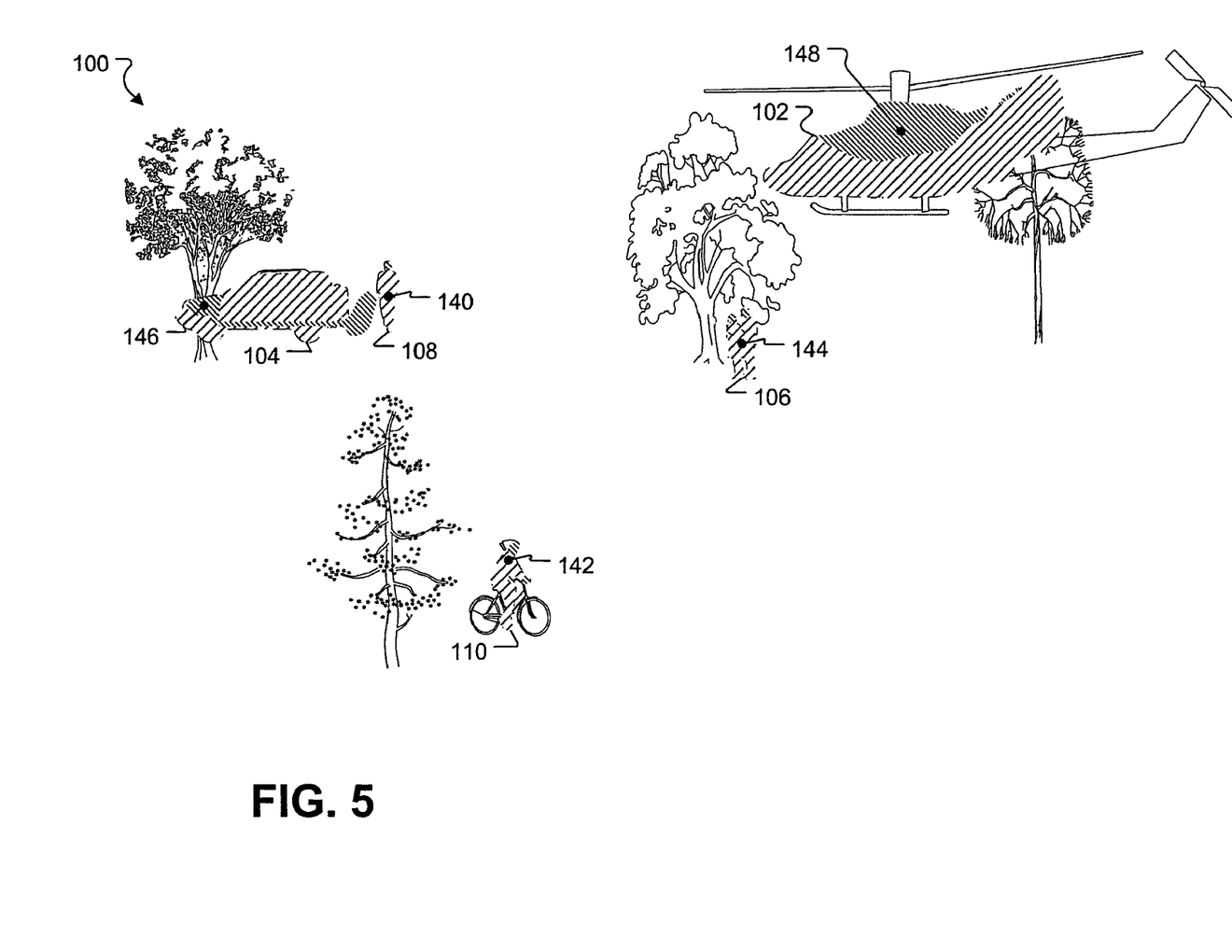
FIG. 5 is a superimposed image of the optical image of FIG. 2 superimposed on the thermal image of FIG. 3, according to an example.

As an example, FIG. 5 shows the thermal image 111 of FIG. 3 superimposed on the optical image 101 of FIG. 2. In accordance with the method 120, described below are various ways of using the thermal image signal (associated with the thermal image 111) to process the optical image signal (associated with the optical image 101). Again for ease of understanding, the description below generally describes processing an optical image signal associated with one or more non-stationary objects. However, it should be understood that the optical image signal associated with one or more stationary objects may also be processed in the manner described (e.g., for an idling car or a standing, stationary man). Further, in the examples described below, a temperature-range input signal may be used to filter stationary and non-stationary objects from a thermal image signal.

d) Optical Processing Regions

In one example, an optical-processing region may be derived from a center of heat-mass associated with an object. A thermally-directed imager may accordingly process an optical image signal according to the center of mass. The strolling man 108, for example, has a center of mass 140. As the strolling man 108 strolls to the left side of the setting 100, the center of mass 140 likewise moves to the left. Similarly, a center of mass 142, associated with the woman 110, will move at a speed associated with the woman 110's rate of travel.

In general, the location of a center of mass may vary with the amount and distribution of temperature within an object. In FIG. 5, for example, the strolling man 108's center of mass is located at about half of his height. The couple 106 has a center of mass 144 that is situated in between them. The helicopter 102 and the SUV, on the other hand, respectively have centers of masses 146, 148 that are centered about their hottest surface (i.e., engine compartment or exhaust).

The center of mass may be determined or calculated by an algorithm run on a thermal imager's processor. Such an algorithm may detect regions of temperature within a thermal image signal, derive a center of mass from the regions of temperature, and accordingly process an optical image signal according to the location of the center of mass. A processor may use the center of mass as a pointer to the location of the optical processing region and accordingly limit the processing of the optical image signal to that region. In one example, the processor may use a predefined window centered about a center of mass to calculate the optical processing zone. In an alternative or additional example, the processor may use the center of mass along with other information conveyed in the thermal image signal to generate the optical processing region. For example, the optical processing region may use a temperature-gradient associated with an object when calculating the optical processing region.

Figure 6:
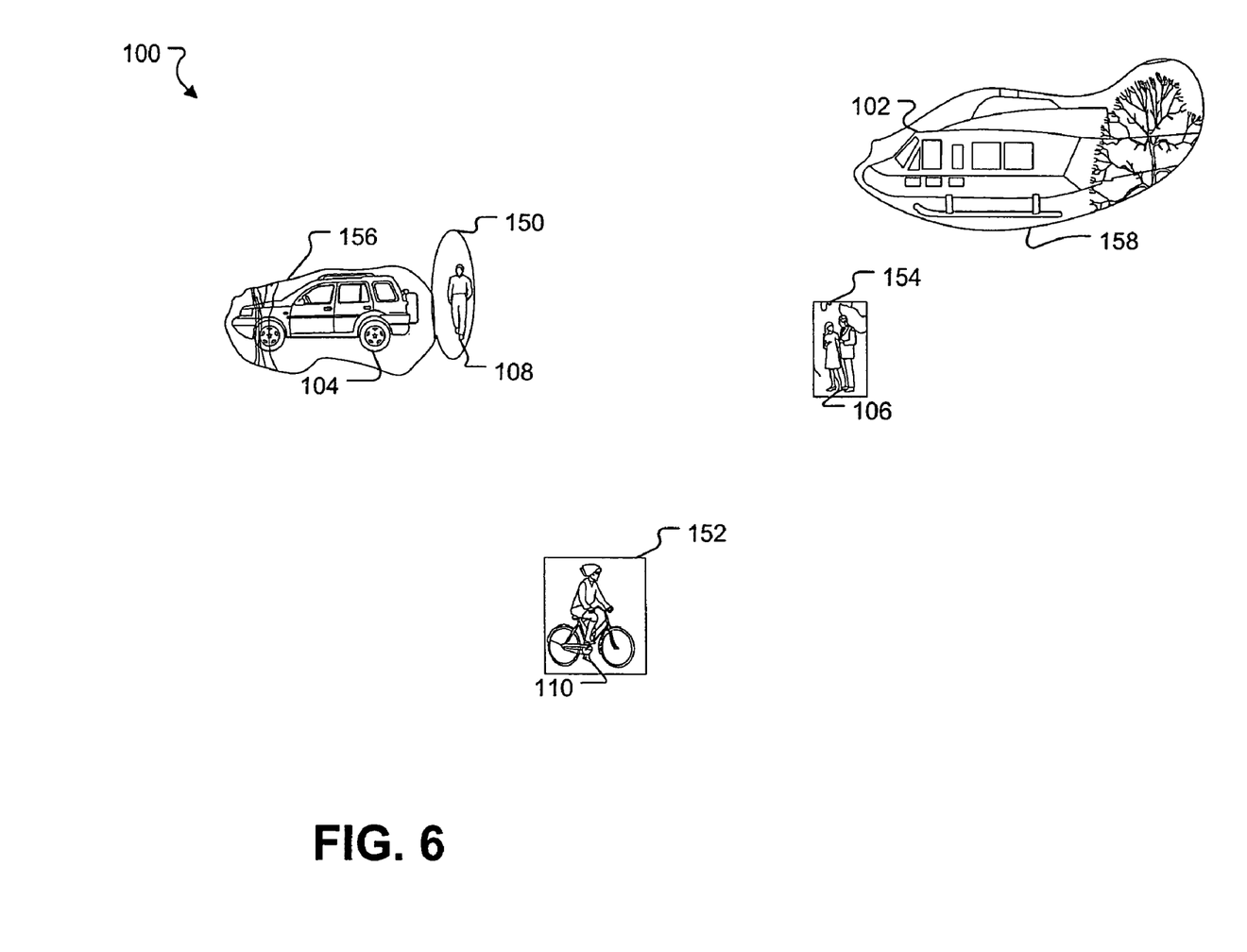
FIG. 6 is an optical image that is a compressed version of the image of FIG. 5, where the image of FIG. 5 has been compressed to optical processing regions created by using a center of heat-mass, according to an example.

FIG. 6 shows an optical image of the setting 100 where the optical image signal associated with the optical image 101 has been confined to various optical processing regions. Each of the optical processing regions, in one form or another, is centered or positioned about a center of mass. The optical processing regions are generally confined to a processing window. For example, the strolling man 108 has an optical processing region defined by an elliptical window 150. The bicycling woman 110 has an optical region defined by a square window 152. The couple 106 has an optical processing region defined by a rectangular window 154. The SUV 104 has an optical processing region defined by a window 156, which overlaps the window 150. The helicopter 102 has an optical processing region defined by a window 158. Note that the window 158 does not capture the entire optical image of the helicopter 102. An optical processing region need not include the entirety of an object. In some examples, it may be preferable to capture portions of an object within an optical processing region (e.g. if the image is particularly large or relatively near within a field of view).

As FIG. 6 shows, the stationary objects have been filtered out of the optical image signal and the optical image processing may be performed exclusively on the optical processing regions. By reducing the processing to objects of interest (i.e., non-stationary objects), all of the data associated with the stationary objects may be filtered and thus reduced overhead associated with transmitting and/or further processing an optical image signal. The thermally-directed imager may also be configured to produce real time feedback by periodically transmitting these compressed-image signals (e.g., by producing compressed-image signals over time as the non-stationary objects move.)

Figure 7:
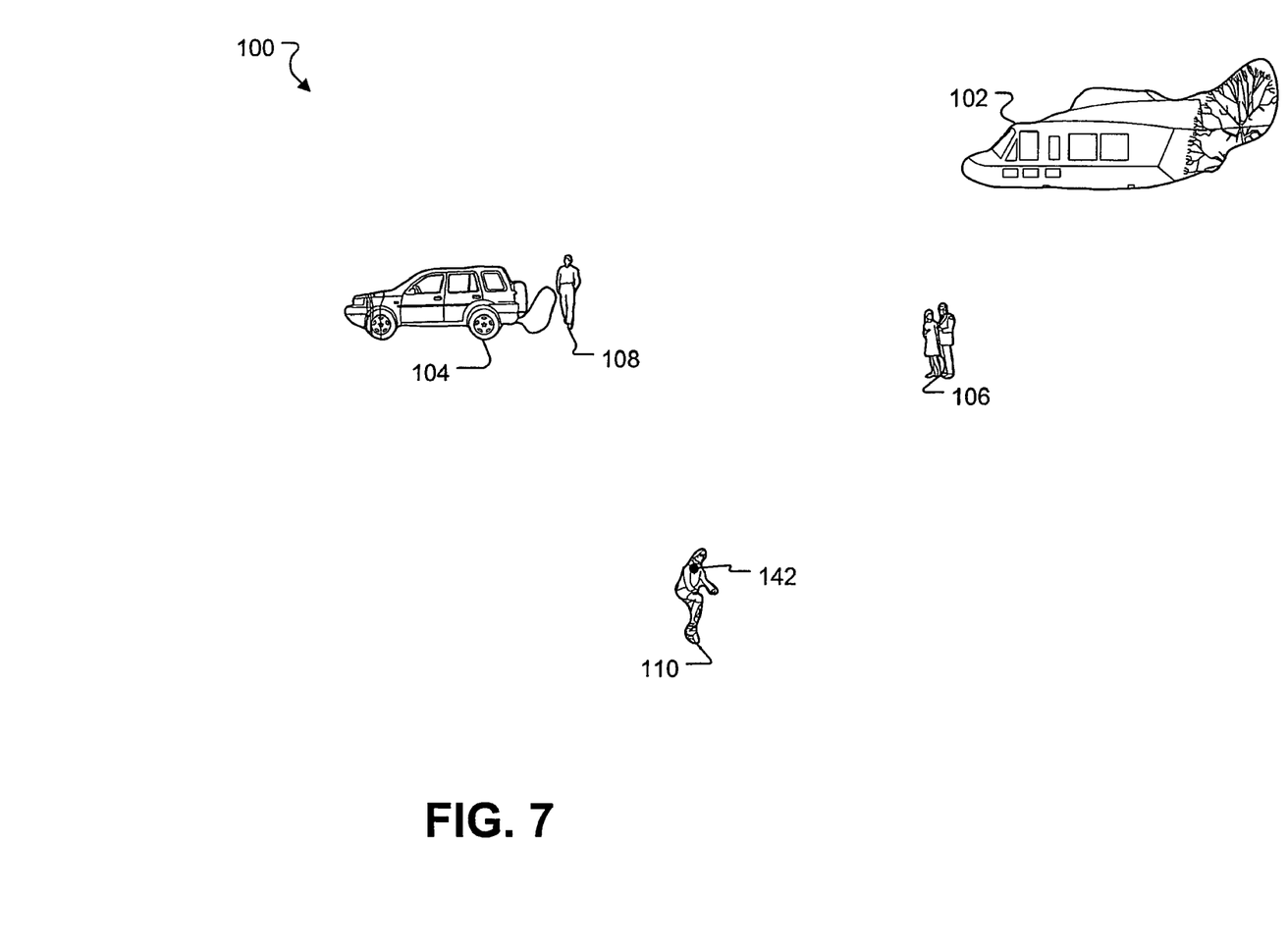
FIG. 7 is an optical image that is a compressed version of the image of FIG. 5, where the image of FIG. 5 has been compressed to optical processing regions created by using an edge detection algorithm, according to an example.

FIG. 6 also shows that a thermally-directed imager may derive a variety of different types of optical processing regions having various shapes and sizes. As described above, such a processor may use various algorithms to determine the size and shape of a processing region. Furthermore, the processor is not limited to using a center of mass when determining an optical processing region. An edge detection algorithm, for example, may determine a temperature boundary or edge of an object, and determine an optical-processing region accordingly. FIG. 7 shows an optical image of the setting 100 where each of the non-stationary objects has been confined to an optical processing region that has been determined by an edge detection algorithm.

Figure 8:
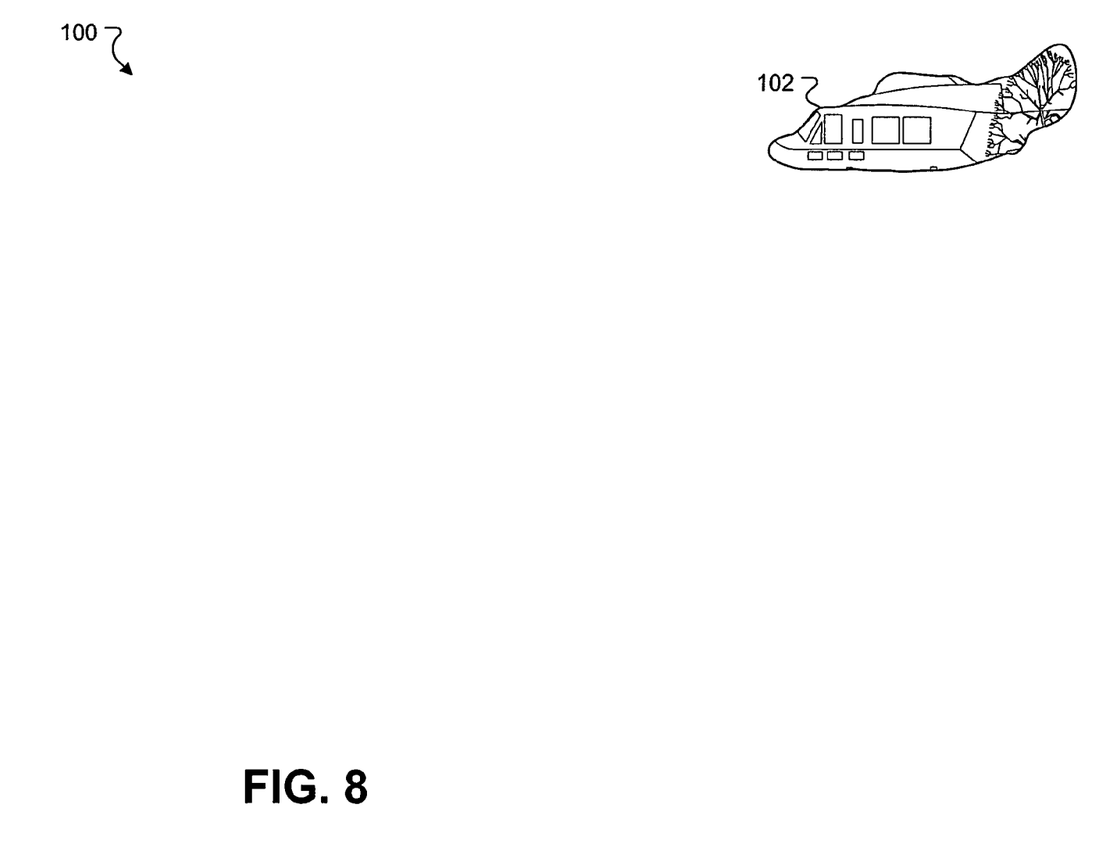
FIG. 8 is an optical image that is further compressed version of the image of FIG. 7, where the image of FIG. 7 has been compressed to a single optical processing region, according to an example.

In yet another example, a thermally-directed imager may also receive a selection input for selecting which objects within an image signal should be processed. For example, if multiple processing regions exist within a thermal image signal, the processor may use the selection input to restrict the processing of the optical image signal to fewer processing zones. As another example, if the thermally-directed imager is to be used in military applications, only military targets may be processed within an optical image signal. FIG. 8 shows such an example, where civilian type objects (e.g. the SUV 104, the couple 106, the strolling man 108, and the bicycling woman 110) have been filtered out of the optical image signal and the thermally-directed imager only uses the optical processing region associated with the helicopter 102.

f) Various Processing Functions

As described above, the thermal image signal may also be used to perform other functions. For example, the thermal image signal may be used to optically zoom or center a lens. A thermal sensor may pick up areas of infrared radiation and a processor may accordingly zoom and/or center the lenses 18, 20 via the lens adjusters 22, 24. (Alternatively, the processor may use the lens adjuster 39 to zoom and/or center the lens 38).

A processor may also be coupled with a transmitter that transmits a compressed-image signal. Because the compressed-image signal is compressed relative to an unprocessed optical image signal, relevant data may be efficiently transmitted to an off-site location. As described above, when monitoring or surveying a location, stationary objects, such as buildings, trees, landscape, etc., may not convey much useful information and may take up valuable bandwidth if not filtered out of an image signal. Compressing the optical image by using infrared radiation to process more relevant objects may conserve and/or optimize image signal transmission.

g) Conclusion

A variety of examples have been described above. More generally, those skilled in the art will understand that changes and modifications may be made to these examples without departing from the true scope and spirit of the present invention, which is defined by the claims. Thus, for example, the thermally-directed optical imager should not be limited to the type of optical processing regions that are derived. Moreover, the various figures relating to optical and thermal images are examples only; a thermally-directed imager may receive radiation from many different types of stationary and non-stationary objects. Also, the thermal and infrared radiation that is received by either a thermal or an optical sensor may be referred to as being reflected off an object. It should be understood that the term "reflected off" may comprise optical and/or infrared radiation that is incident on a surface of an object and reflected off the surface. In addition, the term "reflected off" also comprises optical and/or infrared radiation that is generated by an object (i.e., as an optical and infrared source). Finally, the configuration of the elements within the illustrated thermally-directed imagers may be quite varied. Different types of image sensors, lenses, processors, may be configured in various ways and may be suited to particular applications.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

We claim:

1. A thermally-directed optical imager, comprising:
   a thermal image sensor for receiving infrared radiation and generating a thermal image signal based on the received infrared radiation;
   an optical image sensor for receiving optical radiation and generating an optical image signal based on the received optical radiation; and
   a processor for receiving the thermal image and the optical image signals, determining an optical processing region from the thermal image signal, and processing the optical image signal based on the optical processing region, wherein an amount of processing of the optical image signal is limited based on the optical processing region.

2. The thermally-directed imager as in claim 1, wherein the processed optical image signal is a compressed-image signal.

3. The thermally-directed imager as in claim 2, further comprising a transmitter coupled with the processor for transmitting the compressed-image signal.

4. The thermally-directed imager as in claim 1, further comprising a first lens for focusing the infrared radiation and a second lens for focusing the optical radiation.

5. The thermally-directed imager as in claim 4, wherein the processor is configured to adjust a focus of at least one of the first and the second lenses based on the thermal image signal.

6. The thermally-directed imager as in claim 1, wherein the thermal sensor comprises an infrared transducer array and the optical sensor comprises at least one of a charge coupled device and a CMOS device.

7. The thermally-directed imager as in claim 1, wherein the processor is coupled to receive a temperature-range input signal for confining the optical processing region to a temperature range.

8. The thermally-directed imager as in claim 1, wherein the processor is configured to derive a center of heat-mass from the thermal image signal and use the center of mass to derive the optical processing region.

9. The thermally-directed imager as in claim 1, wherein the processor is configured to determine the optical processing region by performing an edge detection algorithm on the thermal image signal.

10. A method of thermally-directing optical processing, the method comprising using a thermal image signal to direct processing of an optical image signal, wherein an amount of processing of the optical image signal is limited based on the thermal image signal, wherein the thermal image signal is associated with infrared radiation that is reflected off an object, and wherein the optical image signal is associated with optical radiation that is reflected off the object.

11. The method as in claim 10, further comprising transmitting the processed optical image signal.

12. A method of thermally-directing optical processing, the method comprising:
    receiving a thermal image signal;
    determining an optical processing region based on the thermal image signal; and
    processing an optical image signal using the optical processing region, wherein an amount of processing of the optical image signal is limited based on the optical processing region.

13. The method as in claim 12, further comprising:
    receiving a temperature-range input signal; and
    determining the optical processing region based on the temperature-range input signal.

14. The method as in claim 12, wherein determining the optical processing region further comprises detecting a center of heat-mass associated with the thermal image signal.

15. The method as in claim 14, wherein determining the optical processing region further comprises generating a processing window centered about the center of mass.

16. The method as in claim 12, wherein determining the optical processing region further comprises performing an edge detection algorithm.

17. The method as in claim 12, further comprising:
    receiving infrared radiation at a thermal image sensor;
    generating the thermal image signal based on the received infrared radiation;
    receiving optical radiation at an optical image sensor; and
    generating the optical image signal based on the received optical radiation.

18. The method as in claim 17, wherein the optical imager further comprises a lens for focusing the optical radiation.

19. The method as in claim 18, further comprising using the thermal image signal to determine an optical zoom of the lens.

20. The method as in claim 18, further comprising using the thermal image signal to center the lens.

* * * * *